(12) United States Patent
Mattus et al.

(10) Patent No.: US 11,932,322 B2
(45) Date of Patent: Mar. 19, 2024

(54) STEERING DEVICE HAVING A CONNECTOR UNIT FOR MAKING ELECTRICAL CONTACT WITH A STEERING SENSOR UNIT

(71) Applicant: Robert Bosch GmbH, Stuttgart (DE)

(72) Inventors: Waldemar Mattus, Schwaebisch Gmuend (DE); Marten Weber, Huettlingen (DE); Tobias Isdebski, Kernen (DE); Philipp Seibold, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 584 days.

(21) Appl. No.: 17/273,164

(22) PCT Filed: Sep. 9, 2019

(86) PCT No.: PCT/EP2019/073996
§ 371 (c)(1),
(2) Date: Mar. 3, 2021

(87) PCT Pub. No.: WO2020/064315
PCT Pub. Date: Apr. 2, 2020

(65) Prior Publication Data
US 2021/0339793 A1    Nov. 4, 2021

(30) Foreign Application Priority Data
Sep. 26, 2018   (DE) ................... 10 2018 216 484.3

(51) Int. Cl.
*B62D 5/04*  (2006.01)
*B62D 6/10*  (2006.01)
(Continued)

(52) U.S. Cl.
CPC ............. *B62D 5/0403* (2013.01); *B62D 6/10* (2013.01); *G01L 5/221* (2013.01); *H01R 13/562* (2013.01);
(Continued)

(58) Field of Classification Search
CPC ......... B62D 5/0403; B62D 6/10; G01L 5/221; H01R 13/562
See application file for complete search history.

(56) References Cited

U.S. PATENT DOCUMENTS 8,726,530 B2 * 5/2014 Hama ................. B62D 6/10
33/534
11,447,180 B2 * 9/2022 Weber ................ B62D 1/16
(Continued)

FOREIGN PATENT DOCUMENTS

CN    102449858 A    5/2012
CN    104149841 A    11/2014
(Continued)

OTHER PUBLICATIONS

International Search Report corresponding to PCT Application No. PCT/EP2019/073996, dated Dec. 17, 2019 (German and English language document) (5 pages).

*Primary Examiner* — Kevin Hurley
*Assistant Examiner* — Hosam Shabara
(74) *Attorney, Agent, or Firm* — Maginot, Moore & Beck LLP (57) ABSTRACT

A steering device includes: a steering gear housing, which provides a sensor accommodation region; a steering sensor unit, which is situated in the sensor accommodation region when installed; a housing cover, which is provided to cover the sensor accommodation region in the axial direction when installed; and a connector unit, which can be situated in a contact recess in the steering gear housing or in the housing cover, for making, in particular direct, electrical contact with the steering sensor unit during the process of installing the connector unit. The connector unit includes a plug unit with at least one plug element for connection to the steering sensor unit, and a support unit. The connector unit also includes an elastic compensation unit, which is connected fixedly to the plug element and to the support unit and is provided to resiliently support the plug element.

15 Claims, 6 Drawing Sheets

(51) Int. Cl.
*G01L 5/22* (2006.01)
*H01R 13/56* (2006.01)
*H01R 13/627* (2006.01)

(52) U.S. Cl.
CPC ...... *H01R 13/6273* (2013.01); *H01R 2201/26* (2013.01)

(56) References Cited

U.S. PATENT DOCUMENTS

| | | | |
|---|---|---|---|
| 2013/0140105 A1* | 6/2013 | Ji | B62D 5/0403 74/30 |
| 2013/0168125 A1 | 7/2013 | Hama | |
| 2017/0257980 A1 | 9/2017 | Fukunaga | |
| 2021/0122417 A1* | 4/2021 | Abele | B60R 16/027 |
| 2021/0354745 A1* | 11/2021 | Mattus | B62D 15/0215 |

FOREIGN PATENT DOCUMENTS

| | | |
|---|---|---|
| CN | 105098541 A | 11/2015 |
| CN | 105244692 A | 1/2016 |
| CN | 107112692 A | 8/2017 |
| CN | 108423062 A | 8/2018 |
| DE | 10 2005 038 514 A1 | 2/2007 |
| DE | 10 2007 057 299 A1 | 6/2009 |
| DE | 10 2012 202 676 A1 | 8/2013 |
| DE | 10 2013 112 242 A1 | 5/2015 |
| DE | 10 2017 222 999 A1 | 6/2019 |
| JP | 2001-106097 A | 4/2001 |
| JP | 2011-34825 A | 2/2011 |
| JP | 2011-86422 A | 4/2011 |
| JP | 2014-31160 A | 2/2014 |
| JP | 2015-220187 A | 12/2015 |
| JP | 2017-160935 A | 9/2017 |

* cited by examiner

STEERING DEVICE HAVING A CONNECTOR UNIT FOR MAKING ELECTRICAL CONTACT WITH A STEERING SENSOR UNIT

This application is a 35 U.S.C. § 371 National Stage Application of PCT/EP2019/073996, filed on Sep. 9, 2019, which claims the benefit of priority to Serial No. DE 10 2018 216 484.3, filed on Sep. 26, 2018 in Germany, the disclosures of which are incorporated herein by reference in their entirety.

The disclosure proceeds from a steering device having a connector unit for making electrical contact with a steering unit and from a method for assembling a steering device. The disclosure moreover relates to a steering system having such a steering device and to a connector unit of such a steering device.

BACKGROUND

Steering systems for motor vehicles, having steering sensors which for determining a steering angle and/or a steering torque exerted on the steering shaft are disposed on a steering shaft, are known from the prior art. Steering sensors of this type typically comprise a sensor housing which is connected to the steering shaft as well as a sensor element which is disposed in the sensor housing.

In a known assembly process, the sensor housing is pushed onto the steering shaft and fastened to the steering shaft. The steering shaft conjointly with the sensor housing is subsequently inserted into an assembly opening of a steering gear housing, wherein a sensor cable can be simultaneously manually connected to the sensor housing, or the sensor element, respectively, by an assembly technician. The assembly opening is subsequently closed by means of a housing cover. This construction however leads to a complicated and time-consuming assembly process which requires in particular a plurality of assembly steps as well as manual plug-fitting of the sensor cable during the assembly process of the steering shaft, or of the steering sensor, respectively.

The object of the disclosure lies in particular in providing a steering device and a method for assembling a steering device with improved properties in terms of contacting. This object is achieved by the features disclosed herein, while further advantageous design embodiments and refinements are set forth below.

SUMMARY

The disclosure proceeds from a steering device having a steering gear housing which provides a sensor receptacle region, having a steering sensor unit which, in particular for detecting at least one item of steering information, in particular of a steering shaft which is mounted so as to be rotatable about a steering axis, in an assembled state is disposed in the sensor receptacle region, having a housing cover which in an assembled state is provided for covering, in particular closing, the sensor receptacle region in the axial direction, and having a plug connector unit which for, in particular directly, electrically contacting the steering sensor unit in an assembly procedure of the plug connector unit is able to be disposed in a contacting clearance, in particular a bore and/or a cutout, which is advantageously closed in the circumferential direction, of the steering gear housing or of the housing cover, wherein the plug connector unit for connecting to the steering sensor unit comprises a plug-in unit having at least one plug-in element and a support unit.

It is proposed that the plug connector unit comprises an elastic compensation unit which is fixedly, in particular non-releasably, connected to the plug-in element and to the support unit and is provided for resiliently mounting the plug-in element, in particular in an assembly direction for assembling the plug connector unit. On account of this design embodiment, advantageously reliable and/or flexible contacting of the steering sensor unit can in particular be achieved by way of a defined plug-in force. Moreover, an assembly procedure herein can in particular be highly simplified, wherein an advantageous automation of the assembly procedure can be achieved and a number of manual operating steps can be reduced. A flexibility of the steering device can furthermore advantageously be increased and/or an operational reliability improved. Moreover, a service life and/or a durability of the steering device can advantageously be improved.

A "steering device" in this context is in particular to be understood to be at least a part, in particular a functional sub-group, of a steering system, in particular of a vehicle and preferably of a motor vehicle. The steering device herein can in particular also comprise the steering shaft. The steering shaft is advantageously configured in multiple parts and comprises at least an input shaft, preferably a steering spindle, and at least an output shaft which is configured separately from the input shaft, preferably a steering pinion. A longitudinal extent of the steering shaft herein defines in particular the axial direction. The steering gear housing moreover has in particular an assembly opening for receiving the steering sensor unit and advantageously for at least partially receiving the steering shaft, said assembly opening being in particular able to be closed by means of the housing cover. Furthermore, a "steering sensor unit" is in particular to be understood to be a sensor unit which in particular encompasses the steering shaft in the circumferential direction and which by means of a rotation of the steering shaft and advantageously a rotation of the input shaft relative to the output shaft is provided for detecting at least one item of steering information which correlates in particular with an activation of a steering handle of the steering system. The item of steering information herein is preferably a steering angle and/or a steering torque which is in particular applied to the steering shaft by means of the steering handle. The steering sensor unit for detecting the item of steering information can in particular comprise at least one sensor element. "Providing" herein is in particular to be understood as specially conceived and/or equipped. An object being provided for a specific function is in particular to be understood as the object fulfilling and/or carrying out this specific function in at least one state of application and/or operation.

Furthermore, a "plug connector unit" is in particular to be understood to be a unit which, in particular in the assembled state, is operatively connected to the steering gear housing and/or the housing cover and is advantageously configured so as to be separate and/or separately from the steering gear housing and/or the housing cover and is provided for providing a contacting possibility for electrically contacting the steering sensor unit. To this end, the plug connector unit comprises in particular the plug-in unit which comprises the plug-in element, in particular in the form of a plug, a coupling and/or a socket. The plug-in unit in the assembled state is in particular advantageously completely disposed in the sensor receptacle region and provided with a further plug-in unit of the steering sensor unit that communicates with the plug-in unit, in particular at least one further plug-in element, in particular in the form of the plug, a coupling and/or a socket, of the further plug-in unit. The further plug-in unit herein is advantageously mounted so as to be fixed and/or immovable relative to the steering gear housing. The plug-in element and the further plug-in element herein are in particular oriented relative to one another in such a manner that automatic electrical contacting of the steering sensor unit takes place during the assembly procedure of the plug connector unit. Furthermore, a "support unit" is to be understood to be a unit which is advantageously permanently mechanically coupled to the plug-in unit and which is in particular provided for receiving at least part of a weight of the plug-in unit and for mechanically stabilizing the plug-in unit at least in the assembly procedure of the plug connector unit, in particular so as to enable a coupling between the plug-in element and the further plug-in element. Furthermore, a "compensation unit" is in particular to be understood to be a unit which is provided for exerting a force, advantageously a compressive force, on the plug-in element and/or to receive said force from the plug-in element. The compensation unit herein is preferably at least provided for compensating forces which arise in the assembly procedure of the plug connector unit and/or for transmitting said forces to the plug-in unit in such a manner that a coupling is established between the plug-in element and the further plug-in element and, on account thereof, direct and/or automatic electrical contacting of the steering sensor unit takes place in the assembly procedure of the plug connector unit. To this end, the compensation unit comprises in particular at least one elastically configured compensation element which is in particular fixedly connected to the plug-in element and the support unit. An "elastic object" is in particular to be understood to be an object which has at least one sub-region and/or at least one part which in terms of the position thereof in a normal operating state is variable by at least 0.1 cm, preferably by at least 0.25 cm, and particularly preferably by at least 0.5 cm, and which generates a counterforce which is a function of a variation of the position and is preferably proportional to the variation and which acts in particular counter to the variation. The elastic element is in particular able to be repeatedly deformed, in particular without damage, and upon deformation tends in particular to automatically return to its basic shape.

It is furthermore proposed that the plug-in unit comprises at least one electrical line element, in particular a cable, for flexibly connecting the plug-in element to the support unit. The plug-in element on account thereof is advantageously movable such that particularly flexible contacting of the steering sensor unit can in particular be achieved. Moreover, a particularly simple coupling to the further plug-in element can in particular be achieved.

It is moreover advantageously provided that the compensation unit is provided for damping and/or compensating a force, in particular a plug-in force, which in the assembly procedure of the plug connector unit acts on the plug-in element. An advantageous assembly procedure can in particular be achieved on account thereof, wherein tolerances during the assembly procedure of the plug connector unit can in particular be compensated and/or a maximum permissible plug-in force can be varied as a function of a maximum assembly force. Moreover, damage to the plug-in elements can in particular be avoided and a reliable coupling of the plug-in elements can be simultaneously achieved.

It is moreover proposed that the compensation unit is provided for stabilizing the plug-in element and/or for keeping the latter in a defined and/or established orientation in the assembly procedure of the plug connector unit, in particular so as to enable coupling between the plug-in element and the further plug-in element. Particularly simple and/or reliable coupling of the plug-in elements can in particular be achieved on account thereof.

The compensation unit could comprise, for example, at least one compensation element which is configured as a rubber element, as an elastomer element, as a silicone element and/or as a gel element. However, a particularly robust and/or cost-effective design embodiment can in particular be achieved when the compensation unit comprises at least one compensation element which is configured as a spring element, in particular as a tension spring and/or compression spring.

It is furthermore proposed that an assembly direction for assembling the plug connector unit is oriented so as to be at least substantially perpendicular to the axial direction. A plug-in direction for coupling the plug-in element and the further plug-in element herein is preferably oriented so as to be at least substantially perpendicular to the axial direction. The term "at least substantially perpendicular" herein is in particular intended to define an orientation of a direction relative to a reference direction, wherein the direction and the reference direction, in particular when viewed in one plane, enclose an angle of in particular between 82° and 98°, advantageously between 85° and 95°, and particularly preferably between 88° and 92°. Advantageously simple assembling of the plug connector unit can in particular be achieved on account thereof.

Alternatively, it is provided that an assembly direction for assembling the plug connector unit is oriented so as to be at least substantially parallel to the axial direction. A plug-in direction for coupling the plug-in element and the further plug-in element herein is preferably oriented so as to be at least substantially parallel to the axial direction. "At least substantially parallel" here is in particular intended to be understood as being an orientation of a direction relative to a reference direction, in particular in one plane, wherein the direction in relation to the reference direction has a deviation which is in particular less than 8°, advantageously less than 5°, and particularly advantageously less than 2°. An advantageously compact design embodiment can in particular be achieved on account thereof.

It is furthermore proposed that the plug connector unit is provided for providing an electrical connection between the sensor receptacle region and an external side of the steering gear housing, on account of which particularly simple electrical contacting of the steering sensor unit can in particular be achieved. The support unit herein is preferably configured as a cable conduit, in particular for a cable of the plug-in unit and/or a sensor cable, and/or has a cable conduit, in particular for the cable of the plug-in unit and/or the sensor cable, wherein the cable and/or sensor cable can be provided, for example, for establishing and/or providing an electrical connection to a control apparatus of the steering device. The support unit is particularly preferably configured so as to be separate from the steering gear housing and/or the housing cover, and in the assembled state is fixedly connected to the steering gear housing and/or the housing cover.

According to a further design embodiment, it is proposed that the steering device has a positioning unit which in the assembly procedure of the plug connector unit is provided for establishing a defined orientation of the plug connector unit relative to the steering gear housing and/or the housing cover. To this end, the positioning unit can in particular comprise at least one shaped element such as, for example, an elevation and/or a depression, and/or at least one assembly marking, for example in the form of a pictogram. Particularly simple assembling of the plug connector unit can in particular be achieved on account thereof.

A particularly simple and/or reliable coupling of the plug-in elements can in particular be achieved when the steering device has a guide unit which in the assembly procedure of the plug connector unit is provided for guiding the plug connector unit relative to the steering gear housing and/or the housing cover.

The guide unit advantageously comprises at least one guide element which is disposed on the steering gear housing, in particular an external side of the steering gear housing, and/or on the housing cover, in particular an external side of the housing cover. The guide element herein is particularly preferably configured as a guide depression and/or a guide groove. Furthermore, the guide element can in particular also be configured so as to be in one piece with the positioning unit. "In one piece" in this context is in particular to be understood as being at least connected in a materially integral manner and/or so as to be conjointly configured. The materially integral connection can be established, for example, by an adhesive process, an overmolding process, a welding process, a soldering/brazing process, and/or another process. However, in one piece is advantageously to be understood as formed from one-piece and/or in one piece. This one piece is preferably produced from a single blank, a compound and/or a casting, such as in an extrusion method and/or an injection-molding method, for example. Assembling of the plug connector unit can in particular be further simplified on account thereof.

It is moreover proposed that the guide unit comprises at least one further guide element which is disposed on the steering sensor unit and in the assembly process of the plug connector unit is in particular provided for guiding the plug-in element, in particular relative to the further plug-in element. To this end, the further guide element at least in the assembly procedure of the plug connector unit advantageously encompasses the plug-in element at least partially and preferably at least largely. The guide unit is furthermore preferably configured as a guide funnel and in the assembly direction of the plug connector unit is particularly preferably disposed directly in front of the further plug-in element. The term "at least largely" herein is to be understood to be in particular at least 55%, advantageously at least 70%, preferably at least 85%, and particularly advantageously at least 95%. A particularly simple coupling of the plug-in elements can be achieved on account thereof.

The disclosure moreover relates to a method for assembling a steering device, wherein the steering device comprises a steering gear housing which provides a sensor receptacle region, a steering sensor unit which for detecting in particular at least one item of steering information, in particular of a steering shaft which is mounted so as to be rotatable about a steering axis in an assembled state is disposed in the sensor receptable region, a housing cover which in an assembled state is provided for covering, in particular closing, the sensor receptacle region in the axial direction, and a plug connector unit which for, in particular directly, electrically contacting the steering sensor unit in an assembly procedure of the plug connector unit is able to be disposed in a contacting clearance, in particular a bore and/or a cutout, which is advantageously closed in the circumferential direction, of the steering gear housing or of the housing cover, and wherein the plug connector unit for connecting to the steering sensor unit comprises a plug-in unit having at least one plug-in element and a support unit.

It is proposed that the plug connector unit for electrically contacting the steering sensor unit is incorporated into the contacting clearance of the steering gear housing or of the housing cover and the plug-in element by means of an elastic compensation unit of the plug connector unit that is fixedly connected to the plug-in element and the support unit is resiliently mounted in such a manner that forces which arise in the assembly procedure of the plug connector unit are compensated. The advantages already mentioned above can in particular be achieved on account thereof. Advantageously reliable and/or flexible contacting of the steering sensor unit herein can in particular be achieved by way of a defined plug-in force.

In a first assembly step herein, a preassembled, mechanically intercoupled, functional sub-group is preferably produced from the plug-in unit, the support unit and the elastic compensation unit; in a second assembly step, a preassembled steering sensor functional group is produced at least from the steering sensor unit and the steering shaft; in a third assembly step, the preassembled steering sensor functional group is inserted into the assembly opening of the steering gear housing; in a fourth assembly step, the assembly opening is closed by means of the housing cover; and in a fifth assembly step, the plug connector unit in the form of the preassembled functional sub-group is incorporated into the contacting clearance of the steering gear housing or of the housing cover such that direct electrical contacting of the steering sensor unit is achieved. In the assembly procedure of the plug connector unit, the plug-in element herein is advantageously fitted in such a manner up to a terminal detent that the compensation unit is compressed in the assembly direction of the plug connector unit. Alternatively, individual assembly steps and/or a sequence of the assembly steps herein may however also vary.

The steering device, the steering system, the plug connector unit and the method for assembling the steering device herein are not intended to be limited to the application and embodiment described above. In particular, the steering device, the steering system, the plug connector unit and the method for assembling the steering device may, in order to implement a function described herein, have a number of individual elements, components and units which differs from a number stated herein.

BRIEF DESCRIPTION OF THE DRAWINGS

Further advantages are derived from the following description of the drawings. Exemplary embodiments of the disclosure are illustrated in the drawings. The drawings, the description and the claims contain numerous aspects of the disclosure. The person skilled in the art will expediently also consider these aspects individually and combine them so as to form expedient further combinations.

In the drawings.

DETAILED DESCRIPTION

Figure 1:
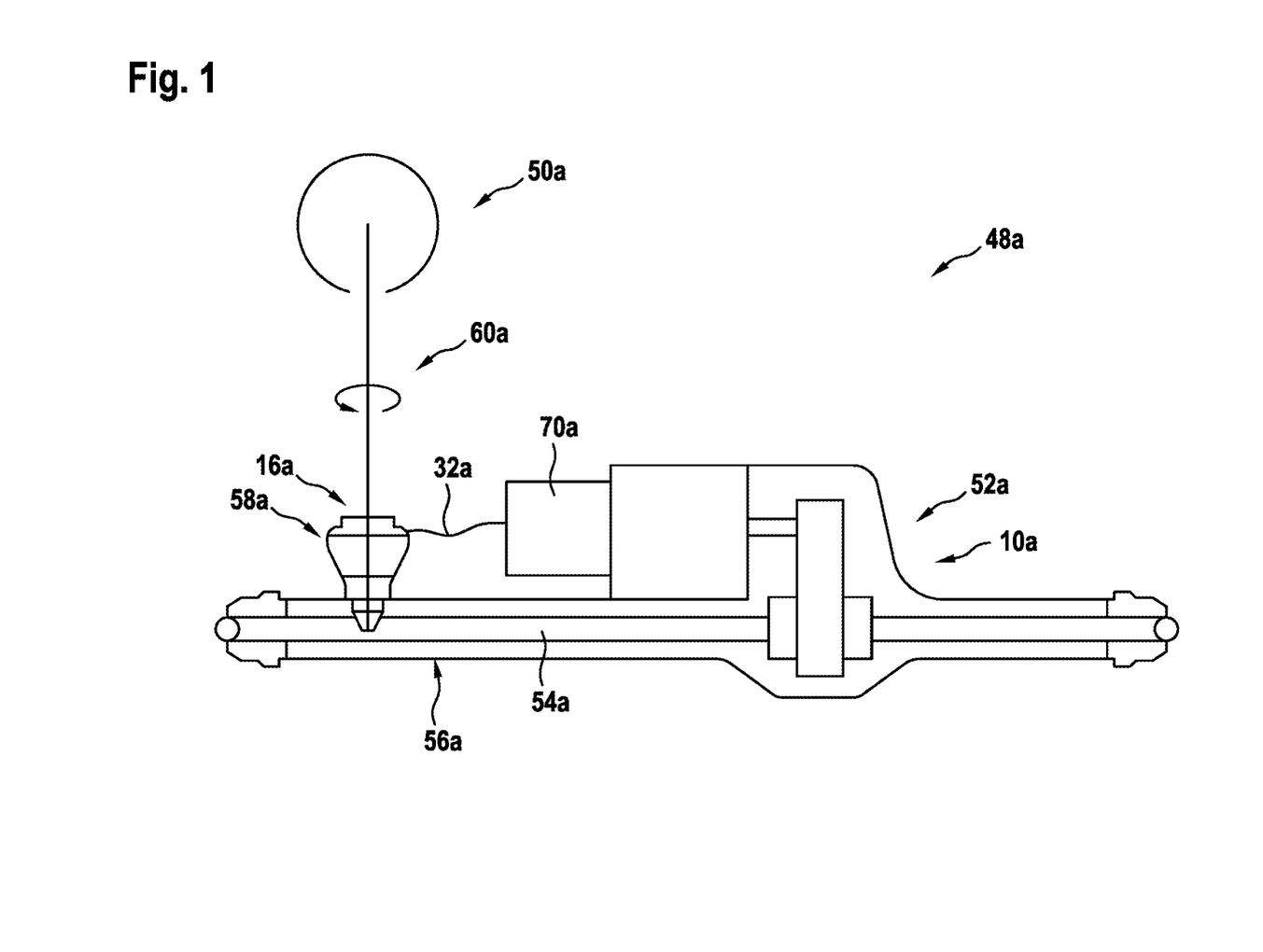
FIG. 1 shows an exemplary steering system having a steering device in a schematic illustration.

FIG. 1 shows a purely exemplary steering system 48a in a schematic illustration. The steering system 48a is configured as an electrically assisted steering system and accordingly has an electrical servo assistance. Furthermore, the steering system 48a is provided for use in a vehicle (not illustrated), in particular a motor vehicle. The steering system 48a in an installed state is operatively connected to vehicle wheels of the vehicle and is provided for influencing a travel direction of the vehicle. In principle, it is of course also conceivable for a steering system to be configured as a hydraulically assisted steering system, in particular having a hydraulic servo assistance.

The steering system 48a has a steering device. The steering device comprises a steering handle 50a, in the present case configured in an exemplary manner as a steering wheel, for applying a manual steering torque, as well as a steering gear 52a which is known per se and provided for converting a steering command at the steering handle 50a to a steering movement of the vehicle wheels. To this extent, the steering gear 52a comprises a steering actuating element 54a as well as a steering gear housing 10a having a first housing portion 56a for the steering actuating element 54a and having a second housing portion 58a which provides a sensor receptacle region 12a (cf. in particular also FIGS. 2 and 4).

The steering device moreover comprises a steering shaft 60a which is known per se. The steering shaft 60a connects the steering handle 50a to the steering gear 52a, in particular to the steering actuating element 54a, and to this end in an assembled state is at least partially inserted in an assembly opening 62a of the steering gear housing 10a, and in particular of the second housing portion 58a, said assembly opening 62a delimiting in particular the sensor receptacle region 12a. A longitudinal extent of the steering shaft 60a herein defines an axial direction 18a. The steering shaft 60a is mounted so as to be rotatable about a steering axis which is oriented so as to be parallel to the axial direction 18a. The steering shaft 60a is furthermore configured in multiple parts. The steering shaft 60a comprises an input shaft in the form of a steering spindle that is assigned to the steering handle 50a, an output shaft in the form of a steering pinion which is assigned to the steering gear 52a and configured so as to be separate from the input shaft, and a torsion element which is advantageously configured as a torsion bar and connects the input shaft to the output shaft. In principle however, it is also conceivable for a steering shaft to be configured in one piece.

The steering device furthermore comprises a housing cover 16a. The housing cover 16a has a passage opening for the steering shaft 60a, said passage opening being sealed by means of an injected sealing element, for example. The housing cover 16a in an assembled state is provided for covering the assembly opening 62a of the steering gear housing 10a and thus the sensor receptacle region 12a in the axial direction 18a, and in particular for closing said assembly opening 62a in a fluid-tight manner.

The steering device furthermore has a steering sensor unit 14a. The steering sensor unit 14a in the assembled state is disposed in the sensor receptacle region 12a and herein encompasses the steering shaft 60a in the circumferential direction. In the present case, the steering sensor unit 14a by means of a rotation of the steering shaft 60a is provided for detecting at least one item of steering information which correlates in particular with an activation of the steering handle 50a, in particular a steering angle and/or a steering torque. To this end, the steering sensor unit 14a comprises a sensor housing 64a, configured in particular as a receptacle housing, as well as at least one sensor element (not illustrated) which for detecting the item of steering information is disposed in the sensor housing 64a.

Figure 2:
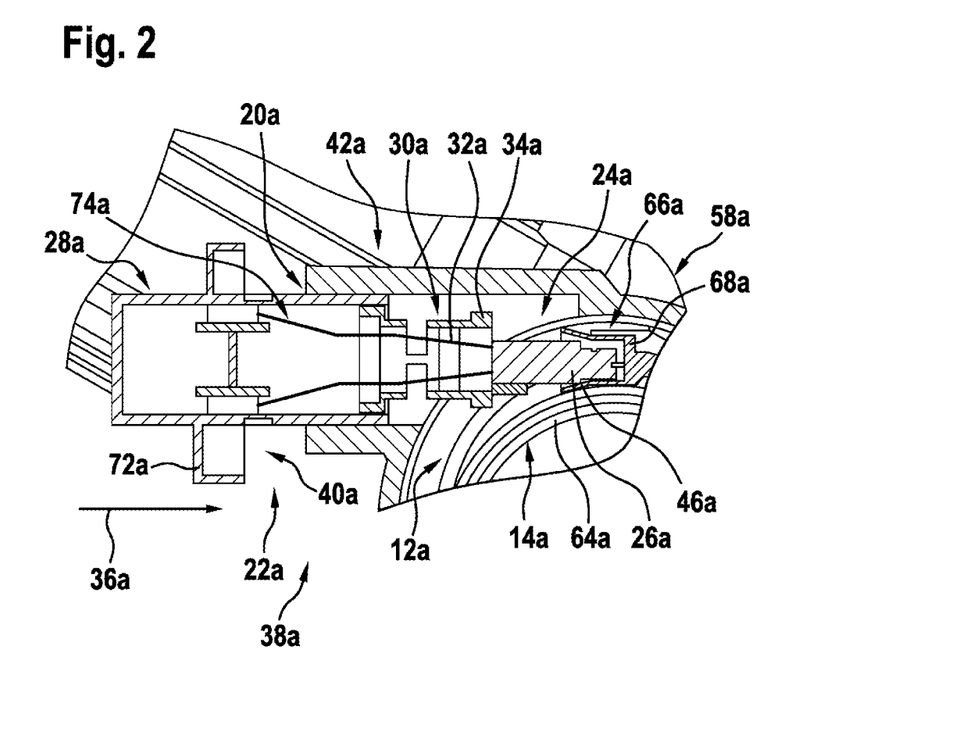
FIG. 2 shows the steering device in an assembled state in a perspective sectional illustration.

The steering sensor unit 14a moreover comprises a first plug-in unit 66a. The first plug-in unit 66a is mounted in the sensor housing 64a. The first plug-in unit 66a in an assembled state of the steering sensor unit 14a herein is disposed so as to be fixed and/or immovable relative to the steering gear housing 10a. The first plug-in unit 66a comprises a first plug-in element 68a. The first plug-in element 68a is electrically connected to the sensor element or to a pressed screen of the steering sensor unit 14a that is connected to the sensor element. The first plug-in element 68a in the present case is configured in an exemplary manner as a coupling and/or a socket. Alternatively however, a first plug-in unit could also comprise a first plug-in element which is configured as a plug, and/or a plurality of first plug-in elements.

Figure 3:
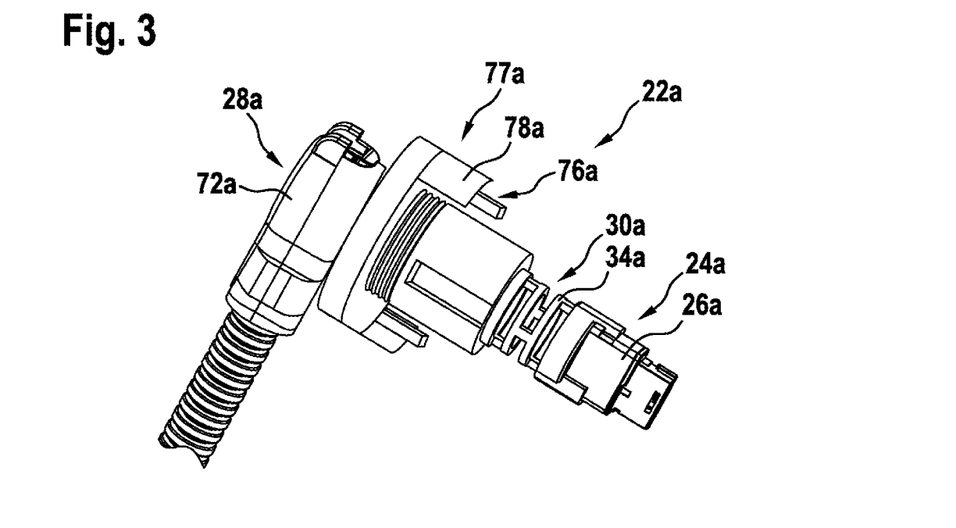
FIG. 3 shows a plug connector unit of the steering device in a perspective illustration.

The steering device for electrically contacting the steering sensor unit 14a and in particular the first plug-in unit 66a moreover comprises a plug connector unit 22a (cf. in particular also FIG. 3). The plug connector unit 22a is configured separately from the housing cover 16a. The plug connector unit 22a is moreover configured separately from the steering gear housing 10a and in the assembled state is fixedly connected to the steering gear housing 10a and in particular to the second housing portion 58a. The plug connector unit 22a in the assembled state herein is disposed in a contacting clearance 20a, in particular in the form of a bore and/or a cutout, of the steering gear housing 10a. The plug connector unit 22a is consequently at least partially disposed outside the steering gear housing 10a and in an assembly procedure can be connected to the steering gear housing 10a, for example by an assembly technician and/or by a machine, in particular in that the plug connector unit 22a is incorporated into the contacting clearance 20a, advantageously in a linear movement. An assembly direction 36a for assembling the plug connector unit 22a herein is oriented so as to be perpendicular to the axial direction 18a. The plug connector unit 22a is furthermore configured as a cable conduit and provided for providing an electrical connection between the sensor receptacle region 12a and an external side 38a of the steering gear housing 10a.

For electrically connecting to the steering sensor unit 14a, the plug connector unit 22a comprises a second plug-in unit 24a which is able to be coupled to the first plug-in unit 66a. To this end, the second plug-in unit 24a comprises a second plug-in element 26a. The second plug-in element 26a is configured in a manner corresponding to the first plug-in element 68a. The second plug-in element 26a in the present case is configured in an exemplary manner as a plug, in particular as a standard plug. Furthermore, the second plug-in element 26a is able to be coupled to the first plug-in element 68a in the assembly direction 36a, the latter oriented so as to be perpendicular to the axial direction 18a. The second plug-in element 26a is provided for being connected to the first plug-in element 68a in the assembly direction 36a and on account thereof for enabling electrical contacting of the steering sensor unit 14a. Alternatively however, a second plug-in unit could also comprise a second plug-in element configured as a coupling and/or a socket, and/or a plurality of second plug-in elements. Moreover, the second plug-in unit 24a comprises at least one electrical line element 32a. The electrical line element 32a is configured so as to be flexible and in the present case in particular as a cable. The electrical line element 32a is configured as a sensor cable and provided for flexibly connecting the second plug-in element 26a to a control apparatus 70a of the steering device, for example. Alternatively however, a plug connector unit could also have at least one sensor cable plug-in element which is in particular disposed in the region of an external side of a steering gear housing and is provided for coupling an, in particular additional, sensor cable.

The plug connector unit 22a furthermore comprises a support unit 28a (cf. in particular also FIG. 3). the support unit 28a comprises a support main body 72a. The support main body 72a in the assembled state contacts the steering gear housing 10a and closes the contacting clearance 20a in a fluid-tight manner. The support main body 72a moreover delimits a cable conduit duct 74a for the electrical line element 32a. On account of the electrical line element 32a, the second plug-in element 26a herein is flexibly connected to the support unit 28a. The support unit 28a is furthermore mechanically coupled to the second plug-in unit 24a. the support unit 28a is provided for absorbing at least part of a weight of the second plug-in unit 24a and, at least in the assembly procedure of the plug connector unit 22a, for mechanically stabilizing the plug connector unit 22a, in particular so as to enable a coupling between the plug elements 26a, 68a.

The plug connector unit 22a moreover comprises an elastic compensation unit 30a. The compensation unit 30a is assigned to the second plug-in element 26a and is operatively connected to the latter. The compensation unit 30a herein is fixedly connected to the second plug-in element 26a. The compensation unit 30a is moreover fixedly connected to the support unit 28a, in particular to the support main body 72a. The compensation unit 30a is provided for mounting the second plug-in element 26a so as to be resilient in the assembly direction 36a which is in particular oriented so as to be perpendicular to the axial direction 18a. The compensation unit 30a herein is provided for impinging the second plug-in unit 26a with a force, and for damping and/or compensating a plug-in force which acts on the second plug-in element 26a when coupling the plug-in elements 26a, 68a. The second compensation unit 30a in the assembly procedure of the plug connector unit 22a is moreover provided for stabilizing the second plug-in element 26a and for keeping the latter in a defined and/or established orientation so as to enable coupling between the first plug-in element 68a and the second plug-in element 26a and for advantageously compensating tolerances during the assembly procedure of the plug connector unit 22a.

To this end, the compensation unit 30a comprises at least one compensation element 34a. In the present case, the compensation unit 30a has exactly one compensation element 34a. The compensation element 34a is furthermore configured as a spring element, in particular as a tension spring and/or compression spring. The compensation element 34a contacts the second plug-in element 26a. The compensation element 34a is fastened to the second plug-in element 26a. The compensation element 34a furthermore contacts the support main body 72a. The compensation element 34a herein is fastened to the support main body 72a. In the present case, the compensation element 34a is consequently disposed between the second plug-in element 26a and the support main body 72a. The compensation element 34a herein at least largely and advantageously completely encompasses the electrical line element 32a. In the present exemplary embodiment, the compensation element 34a is furthermore configured separately and/or so as to be separate from the second plug-in element 26a and the support main body 72a. According to a further exemplary embodiment however, the compensation element 34a can alternatively also be configured so as to be in one piece with the second plug-element 26a and/or the support main body 72a. Furthermore, a compensation unit could also comprise a plurality of compensation elements and/or at least one compensation element which differs from a spring element.

In order for a correct orientation of the plug-in elements 26a, 68a relative to one another to be ensured in the assembly procedure of the plug connector unit 22a, the steering device can moreover have a positioning unit 40a which in the assembly procedure establishes a defined orientation of the plug connector unit 22a relative to the steering gear housing 10a. The positioning unit 40a herein can comprise at least one shaped element, for example, such as an elevation and/or depression, for example, and/or at least one assembly marking, for example in the form of a pictogram. Alternatively however, it is also conceivable for such a positioning unit of this type to be dispensed with.

The steering device can moreover comprise a guide unit 42a which in the assembly procedure of the plug connector unit 22a is provided for at least guiding the plug connector unit 22a relative to the steering gear housing 10a. In principle however, it is also conceivable for a guide unit of this type to be dispensed with.

Figure 4:
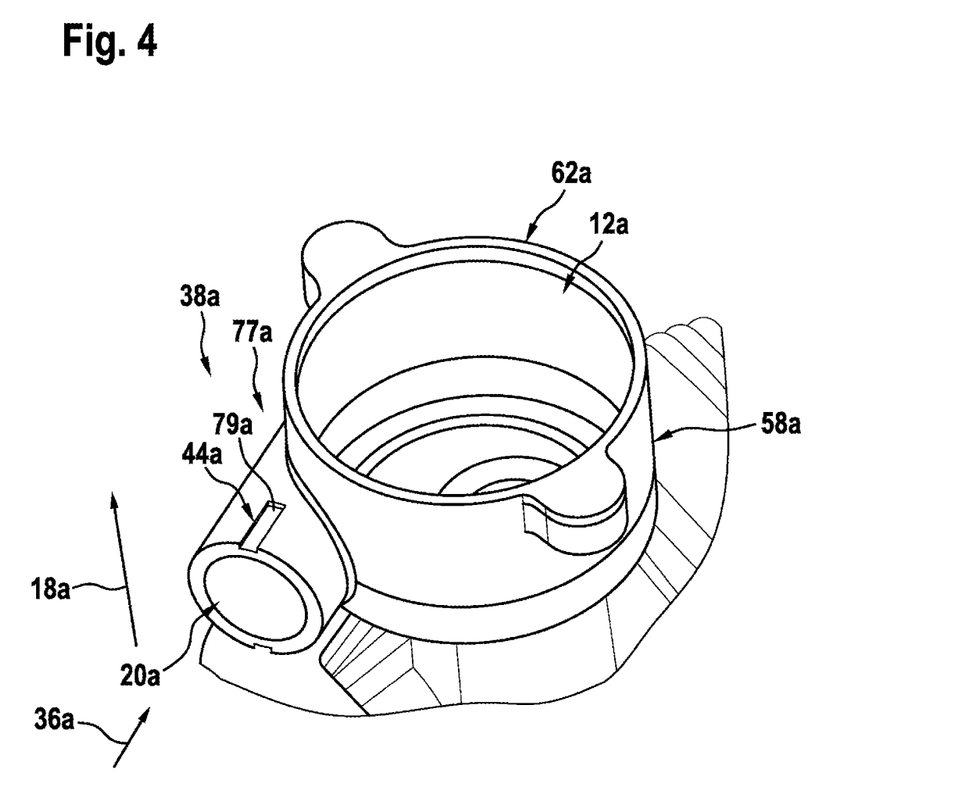
FIG. 4 shows a steering gear housing of the steering device in a perspective illustration.

The guide unit 42a comprises at least one first guide element 44a which is assigned to the steering gear housing 10a (cf. in particular FIG. 4). The guide unit 42a in the present case in an exemplary manner comprises two first guide elements 44a which are in particular disposed on the external side 38a of the steering gear housing 10a, and in particular in the region of the contacting clearance 20a of the steering gear housing 10a. The first guide elements 44a are configured so as to be in one piece with the positioning unit 40a. The first guide elements 44a herein are in each case configured as a guide depression and/or a guide groove and have a linear profile in the assembly direction 36a of the plug connector unit 22a. The first guide elements 44a in the present case in the assembly procedure are provided for guiding the plug connector unit 22a, in particular in a linear movement, relative to the steering gear housing 10a. In order for the plug connector unit 22a to be guided in the assembly procedure, the first guide elements 44a are provided for interacting with further first guide elements 76a of the plug connector unit 22a, in particular of the support unit 28a. Alternatively however, a first guide element could also be configured so as to be separate from a positioning unit. It is moreover conceivable for exactly one first guide element or at least three guide elements to be used. It is moreover conceivable for first guide elements to be completely dispensed with.

The guide unit 42a furthermore comprises at least one second guide element 46a which is assigned to the steering sensor unit 14a (cf. in particular FIG. 2). The second guide element 46a is disposed on the steering sensor unit 14a. The second guide element 46a is disposed on the first plug-in unit 66a. The second guide element 46a herein is configured so as to be in one piece with the first plug-in unit 66a. The second guide element 46a is configured as a filling funnel and in the assembly direction 36a of the plug connector unit 22a is disposed directly in front of the first plug-in element 68a. The second guide element 46a in the assembly procedure of the plug connector unit 22a is provided for guiding the second plug-in element 26a. Alternatively, a second guide element could also be configured so as to be separate from a steering sensor unit and/or a first plug-in unit. It is moreover conceivable for a second guide element to be completely dispensed with.

The steering device moreover has a fastening unit 77a which is provided for fastening the plug connector unit 22a, in particular the support unit 28a, to the steering gear housing 10a. The fastening unit 77a to this end comprises at least one fastening element 78a which is assigned to the plug connector unit 22a, and at least one further fastening element 79a which is assigned to the steering gear housing 10a and is configured in a manner corresponding to the fastening element 78a. In principle, the fastening unit 77a, herein can comprise an arbitrary number of fastening elements 78a, 79a. The fastening unit 77a however preferably comprises at least two fastening elements 78a which are assigned to the plug connector unit 22a, and at least two further fastening elements 79a which are assigned to the steering gear housing 10a. The fastening elements 78a, 79a in the present case in an exemplary manner are configured as latching elements. The fastening elements 78a, 79a are provided for fixing the plug connector unit 22a in a final assembly position.

An exemplary method for assembling the steering device will be described hereunder with reference to FIG. 5.

In a first assembly step 80a, a mechanically intercoupled, preassembled functional sub-group is produced at least from the second plug-in unit 24a, the support unit 28a and the compensation unit 30a.

In a second assembly step 82a, a preassembled steering sensor functional group is moreover produced at least from the steering sensor unit 14a and the steering shaft 60a.

In a third assembly step 84a, the preassembled steering sensor functional group is inserted into the assembly opening 62a of the steering gear housing 10a, wherein the steering shaft 60a is pushed in directly up to a terminal position.

In a fourth assembly step 86a, the assembly opening 62a is closed by means of the housing cover 16a.

In a fifth assembly step 88a, the plug connector unit 22a in the form of the preassembled functional sub-group is incorporated into the contacting clearance 20a, wherein a defined orientation of the plug connector unit 22a relative to the steering gear housing 10a is established on account of the positioning unit 40a and the guide unit 42a, and linear guiding of the plug connector unit 22a takes place relative to the steering gear housing 10a, on account of which direct electrical contacting of the steering sensor unit 14a can be achieved. Moreover, the second plug-in element 26a in the assembly direction 36a of the plug connector unit 22a, and in particular by means of the compensation unit 30a, is resiliently mounted in such a manner that forces which arise in the assembly procedure of the plug connector unit 22a are compensated. In the assembly procedure of the plug connector unit 22a, the second plug-in element 26a is advantageously fitted in such a manner up to a terminal detent that the compensation unit 30a is compressed in the assembly direction 36a of the plug connector unit 22a. The plug connector unit 22a in the final assembly position is then fixed to the steering gear housing 10a by means of the fastening elements 78a, 79a.

Figure 5:
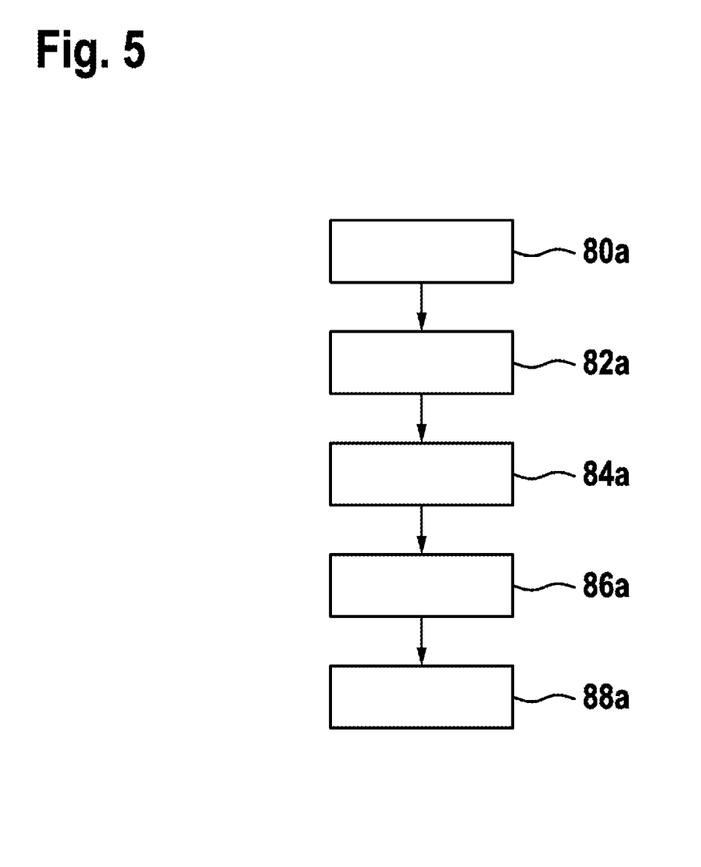
FIG. 5 shows an exemplary flow chart of a method for assembling the steering device.

The exemplary flowchart in FIG. 5 herein is intended to describe a method for assembling the steering device in only an exemplary manner. In particular, individual assembly steps and/or a sequence of the assembly steps may vary. For example, the first assembly step 80a and/or the second assembly step 82a could in principle also be dispensed with, for example if the preassembled functional sub-group and/or the preassembled steering sensor functional group are/is already commercially available. Furthermore, guiding of the plug connector unit 22a in the fifth assembly step 88a could also take place in a manner which differs from linear guiding.

Figure 6:
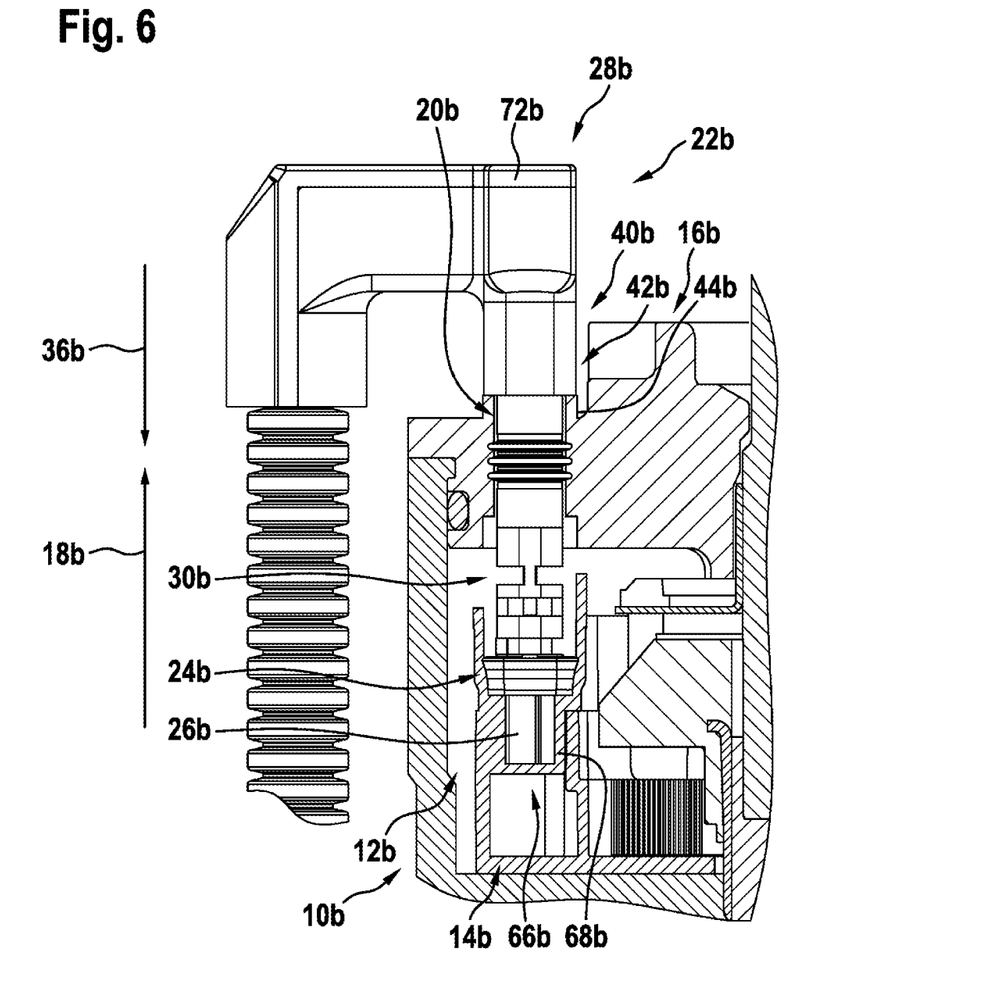
FIG. 6 shows a further exemplary embodiment of a further steering device in a perspective sectional illustration.
Figure 7:
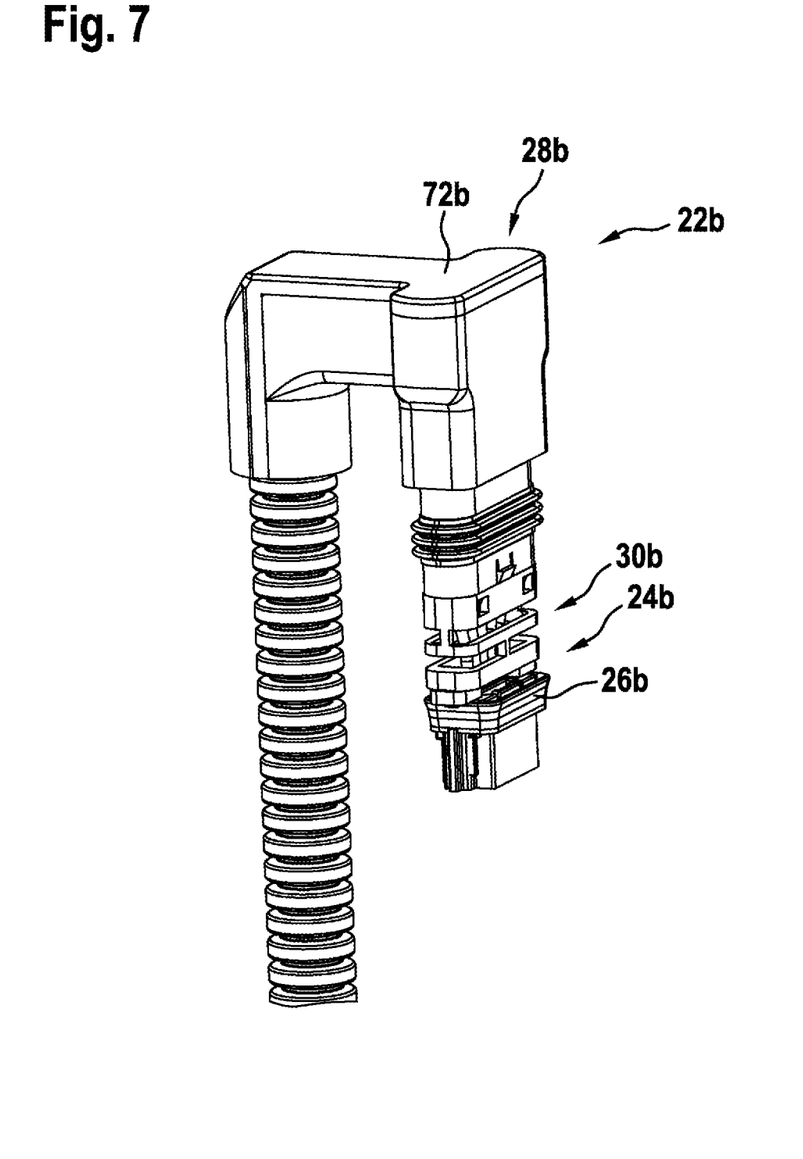
FIG. 7 shows a plug connector unit of the further steering device from FIG. 6 in a perspective illustration.

A further exemplary embodiment is shown in FIGS. 6 and 7. The descriptions hereunder and the drawings are substantially limited to the point of differentiation between the exemplary embodiments, wherein in terms of identically identified components, in particular in terms of components with the same reference signs, reference in principle can also be made to the drawings and/or the description of the other exemplary embodiment, in particular the exemplary embodiment of FIGS. 1 to 5. In order for the exemplary embodiments to be differentiated, the suffix a has been added to the reference signs of the exemplary embodiment in FIGS. 1 to 5. The suffix a in the exemplary embodiment of FIGS. 6 and 7 has been replaced by the suffix b.

The further exemplary embodiment of FIGS. 6 and 7 differs at least substantially from the preceding exemplary embodiment by way of an assembly direction 36b of a plug connector unit 22b of a steering device.

In the present case, an assembly direction 36b for assembling the plug connector unit 22b is oriented so as to be parallel to an axial direction 18b. The plug connector unit 22b herein is configured so as to be separate from a housing cover 16b and in the assembled state is fixedly connected to the housing cover 16b. The plug connector unit 22b in the assembled state is disposed in a contacting clearance 20b, in particular in the form of a bore and/or a cutout, of the housing cover 16b. The plug connector unit 22b is consequently at least partially disposed outside a sensor receptacle region 12b of a steering gear housing 10b, and in an assembly procedure can be connected, for example by an assembly technician and/or by a machine, to the housing cover 16b, in particular in that the plug connector unit 22b is incorporated into the contacting clearance 20b, advantageously in a linear movement.

Consequently, a second plug-in element 26b of a second plug-in unit 24b in the assembly direction 36b, the latter being oriented so as to be parallel to the axial direction 18b, is able to be coupled to a first plug-in element 68b of a first plug-in unit 66b of a steering sensor unit 14b. Moreover, a support main body 72b of a support unit 28b in the assembled state contacts the housing cover 16b and closes the contacting clearance 20b in a fluid-tight manner. Moreover, a compensation unit 30b is provided for mounting the second plug-in element 26b so as to be resilient in the assembly direction 36b, the latter being in particular oriented so as to be parallel to the axial direction 18b.

Furthermore, a positioning unit 40b is assigned to the housing cover 16b and in the assembly procedure of the plug connector unit 22b is provided for establishing a defined orientation of the plug connector unit 22b relative to the housing cover 16b. Moreover, at least first guide elements 44b of a guide unit 42b are assigned to the housing cover 16b and in particular disposed in the region of the contacting clearance 20b of the housing cover 16b. The same also applies to a fastening unit (not explicitly illustrated) which in this case is provided for fastening the plug connector unit 22b, in particular the support unit 28b, to the housing cover 16b. Irrespective thereof, the positioning unit 40b, the guide unit 42b and the fastening unit are however substantially identical to the positioning unit 40a, the guide unit 42a and the fastening unit 77a of the preceding exemplary embodiment.

The invention claimed is:

1. A steering device comprising:
a steering gear housing defining a sensor receptacle region;
a steering sensor unit disposed in the sensor receptacle region;
a housing cover configured to cover the sensor receptacle region in an axial direction; and
a plug connector unit arranged in a contacting clearance defined in the steering gear housing or the housing cover so as to electrically contact the steering sensor unit in an assembly procedure of the plug connector unit, the plug connector unit comprising:
a plug-in unit configured to connect to the steering sensor unit, the plug-in unit comprising at least one plug-in element and a support unit; and
an elastic compensation unit fixedly connected to the plug-in element and to the support unit, the elastic compensation unit configured to resiliently mount the plug-in element.

2. The steering device as claimed in claim 1, wherein the plug-in unit further comprises at least one electrical line element flexibly connecting the plug-in element to the support unit.

3. Steering device as claimed in claim 1, wherein the elastic compensation unit is configured to damp and/or compensate for a force acting on the plug-in element during the assembly procedure of the plug connector unit.

4. The steering device as claimed in claim 1, wherein the elastic compensation unit is provided for configured to stabilize the plug-in element and/or retain the plug-in element in a defined orientation during the assembly procedure of the plug connector unit.

5. The steering device as claimed in claim 1, wherein the elastic compensation unit comprises at least one compensation element configured as a spring element.

6. The steering device as claimed in claim 1, wherein an assembly direction for assembling the plug connector unit is oriented so as to be at least substantially perpendicular to the axial direction.

7. The steering device as claimed in claim 1, wherein the plug connector unit defines an assembly direction for assembling the plug connector unit, the assembly direction oriented so as to be at least substantially parallel to the axial direction.

8. The steering device as claimed in claim 1, wherein the plug connector unit is configured to provide an electrical connection between the sensor receptacle region and an external side of the steering gear housing.

9. The steering device as claimed in claim 1, further comprising:
a positioning unit configured to establish a defined orientation of the plug connector unit relative to the steering gear housing and/or the housing cover during the assembly procedure of the plug connector unit.

10. The steering device as claimed in claim 1, further comprising:
a guide unit configured to guide the plug connector unit relative to the steering gear housing and/or the housing cover during the assembly procedure of the plug connector unit.

11. The steering device as claimed in claim 10, wherein the guide unit comprises at least one guide element disposed on the steering gear housing and/or on the housing cover.

12. The steering device as claimed in claim 11, wherein the guide unit further comprises at least one further guide element disposed on the steering sensor unit.

13. The steering device as claimed in claim 1, wherein the steering device is arranged in a steering system.

14. A plug connector unit of a steering device that has a steering gear housing defining a sensor receptacle region, a steering sensor unit disposed in the sensor receptacle region, and a housing cover configured to cover the sensor receptacle region in an axial direction, the plug connector unit comprising:
a plug-in unit configured to connect to the steering sensor unit, the plug-in unit comprising at least one plug-in element and a support unit; and
an elastic compensation unit fixedly connected to the plug-in element and to the support unit, the elastic compensation unit configured for resiliently mounting the plug-in element,
wherein the plug connector unit is configured to be arranged in a contacting clearance defined in the steering gear housing or the housing cover so as to electrically contact the steering sensor unit in an assembly procedure of the plug connector unit.

15. A method for assembling a steering device that includes a steering gear housing defining a sensor receptacle region, a steering sensor unit configured to be disposed in the sensor receptacle region, a housing cover configured to cover the sensor receptacle region in an axial direction, and a plug connector unit, the method comprising:
incorporating the plug connector unit into a contacting clearance of the steering gear housing or the housing cover to electrically contact the plug connector unit to the steering sensor unit; and
resiliently mounting a plug-in element of a plug-in unit of the plug connector unit with an elastic compensation unit of the plug connector unit that is fixedly connected to the plug-in element and a support unit of the plug-in unit in such a manner that forces which arise in the assembly procedure of the plug connector unit are compensated.

* * * * *

UNITED STATES PATENT AND TRADEMARK OFFICE
CERTIFICATE OF CORRECTION

PATENT NO. : 11,932,322 B2
APPLICATION NO. : 17/273164
DATED : March 19, 2024
INVENTOR(S) : Mattus et al.

Page 1 of 1

It is certified that error appears in the above-identified patent and that said Letters Patent is hereby corrected as shown below:

In the Claims

In Claim 4, at Column 13, Line 30: the phrase "provided for" should be deleted.

Signed and Sealed this
Twenty-fourth Day of September, 2024

Katherine Kelly Vidal
*Director of the United States Patent and Trademark Office*